US012236538B2

(12) United States Patent
Kawakami et al.

(10) Patent No.: US 12,236,538 B2
(45) Date of Patent: Feb. 25, 2025

(54) VIEWING TERMINAL, VIEWING METHOD, VIEWING SYSTEM, AND PROGRAM

(71) Applicant: DWANGO Co., Ltd., Tokyo (JP)

(72) Inventors: Nobuo Kawakami, Tokyo (JP); Shinnosuke Iwaki, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 17/791,486

(22) PCT Filed: Feb. 3, 2021

(86) PCT No.: PCT/JP2021/003944
§ 371 (c)(1),
(2) Date: Jul. 7, 2022

(87) PCT Pub. No.: WO2021/157616
PCT Pub. Date: Aug. 12, 2021

(65) Prior Publication Data
US 2023/0043422 A1 Feb. 9, 2023

(30) Foreign Application Priority Data

Feb. 7, 2020 (JP) ................................ 2020-019368

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06T 13/40* (2013.01); *G09B 5/14* (2013.01); *H04N 21/235* (2013.01); *H04N 21/44* (2013.01)

(58) Field of Classification Search
CPC .................................................. G06T 19/006
See application file for complete search history.

(56) References Cited

U.S. PATENT DOCUMENTS

2004/0104935 A1* 6/2004 Williamson ........... G06V 10/10
715/757
2015/0356788 A1* 12/2015 Abe ...................... A63F 13/335
345/633
(Continued)

FOREIGN PATENT DOCUMENTS

CN 106781755 A 5/2017
CN 108319373 A 7/2018
(Continued)

OTHER PUBLICATIONS

"Translation of International Search Report for PCT/JP2021/003944, mailed Aug. 12, 2021".
(Continued)

*Primary Examiner* — Samantha (Yuehan) Wang
(74) *Attorney, Agent, or Firm* — Dorsey & Whitney LLP

(57) ABSTRACT

A student terminal is for viewing a class given in a virtual space that is immersive. The student terminal includes: a VR function section configured to display the virtual space according to virtual space information; and an input section for receiving a video capturing a desk of a student who views the class. The VR function section extracts, from the video, an area including a top plate of the desk corresponding to a desk object in the virtual space, and performs image composition for fitting a video capturing the area onto a top plate of the desk object.

20 Claims, 7 Drawing Sheets

(51) Int. Cl.
   *G06T 13/40* (2011.01)
   *G09B 5/14* (2006.01)
   *H04N 21/235* (2011.01)
   *H04N 21/44* (2011.01)

(56) References Cited

U.S. PATENT DOCUMENTS

| 2016/0300392 | A1 | 10/2016 | Jonczyk et al. | |
| 2017/0061696 | A1* | 3/2017 | Li | G02B 27/017 |
| 2020/0051336 | A1* | 2/2020 | Ichikawa | G06T 19/006 |

FOREIGN PATENT DOCUMENTS

| JP | 2004061783 A | 2/2004 |
| JP | 2005128877 A | 5/2005 |
| JP | 2012203786 A | 10/2012 |
| JP | 2019101945 A | 6/2019 |
| JP | 2019128721 A | 8/2019 |
| WO | 2015093129 A1 | 6/2015 |
| WO | 2021157616 A1 | 8/2021 |

OTHER PUBLICATIONS

Office Action and Translation for CN 202180009145.6, mailed on Jan. 25, 2024.
[English translation] Notice of Reasons for Rejection for Japanese Patent Application No. 2020-140003 dated Nov. 21, 2023, pp. all.
[English Translation] Decision of Refusal for Japanese Patent Application No. 2020-140003, dated Mar. 12, 2024, pp. all.
[English translation] Second Examination Opinion Notice for Chinese Patent Application No. 202180009145.6 dated Jun. 18, 2024, pp. all.

* cited by examiner

VIEWING TERMINAL, VIEWING METHOD, VIEWING SYSTEM, AND PROGRAM

CROSS REFERENCE TO RELATED APPLICATION(S)

This application is a U.S. National Stage filing under 35 U.S.C. § 371 of PCT Application No. PCT/JP2021/003944, filed Feb. 3, 2021, which claims priority to Japanese Application No. 2020-019368, filed Feb. 7, 2020, which are incorporated herein by reference, in their entirety, for any purpose.

TECHNICAL FIELD

The present invention relates to a technique for viewing a class given in a virtual space.

BACKGROUND ART

In recent years, not only correspondence education using television or radio but also correspondence education systems utilizing information communication technology (ICT) have been widely employed.

As one of such communication education systems utilizing the ICT, it is conceivable that, with the use of an immersive virtual reality (VR) technique, for example, a student wearing a head mounted display (HMD) takes a class in a virtual space. By participating in the class in the immersive virtual space, the student can shut down information from the outside world and concentrate more on the class as compared to the ones conducted using a television or a personal computer.

CITATION LIST

Patent Documents

PATENT DOCUMENT 1: Japanese Unexamined Patent Publication No. 2012-203786
PATENT DOCUMENT 2: Japanese Unexamined Patent Publication No. 2019-101945

SUMMARY OF THE INVENTION

Technical Problems

However, in an immersive virtual space in which the student's field of view is covered with an HMD or another device, the student cannot use real objects such as a textbook, a notebook, or a personal computer on a desk in the real space, unless taking off the HMD. The action of putting on and taking off the HMD during a class given in the virtual space is troublesome.

Such a technique is known that a video captured by a camera equipped with an HMD is displayed in a virtual space upon detection that a user wearing the HMD faces downward. With the use of this technique, a student can use a textbook or a notebook in the real space without taking off the HMD. However, the known method is such that a video of the real space is displayed below the virtual space without taking into consideration an object positioned in the virtual space, so that the sense of immersion would be lost.

Patent Document 1 discloses a technique of compositing a virtual image of a character and a real image, and causing the character to take a realistic action in accordance with a figure included in the real image. The technique disclosed in Patent Document 1 is directed to the image composition of a virtual character on the real space, but not to image composition of a video of a real object present in the real space onto the virtual space.

Patent Document 2 discloses a technique of inputting handwritten letters in a virtual space. The technique of Patent Document 2 is such that an object corresponding to an operation panel (e.g., an acrylic panel) present in the real space is displayed in the virtual space. When the user writes letters on the operation panel with a finger in the real space, the written letters are recognized and displayed on the object in the virtual space. This allows the user to input handwritten letters into the virtual space with the use of the operation panel in the real space but the letters written on the operation panel in the real space are not kept and cannot be used to make a note in the real space.

The present invention was attained in view of the aforementioned problems, and it is an object of the present invention to allow a user to use a real object in the real space with an HMD kept on.

Solution to the Problems

A viewing system according to one aspect of the present invention is a viewing system for viewing a class given in a virtual space that is immersive, the viewing system including: a server configured to distribute the class; and a viewing terminal for viewing the class, the server including: a distribution section configured to distribute virtual space information for displaying the class, the viewing terminal including: a display section configured to display the virtual space according to the virtual space information; and an input section for receiving a video capturing a real space including at least a desk of a student who views the class, and the display section being configured to extract an area including a top plate of the desk of the student from the video, and perform image composition for fitting a video capturing the area including the top plate of the desk of the student onto a top plate of a desk object in the virtual space.

Advantages of the Invention

The present invention allows a user to use a real object in the real space with an HMD kept on.

DESCRIPTION OF EMBODIMENT

[System Configuration]

Now, a class content viewing system according to one embodiment of the present invention will be described herein with reference to the drawings.

Figure 1:
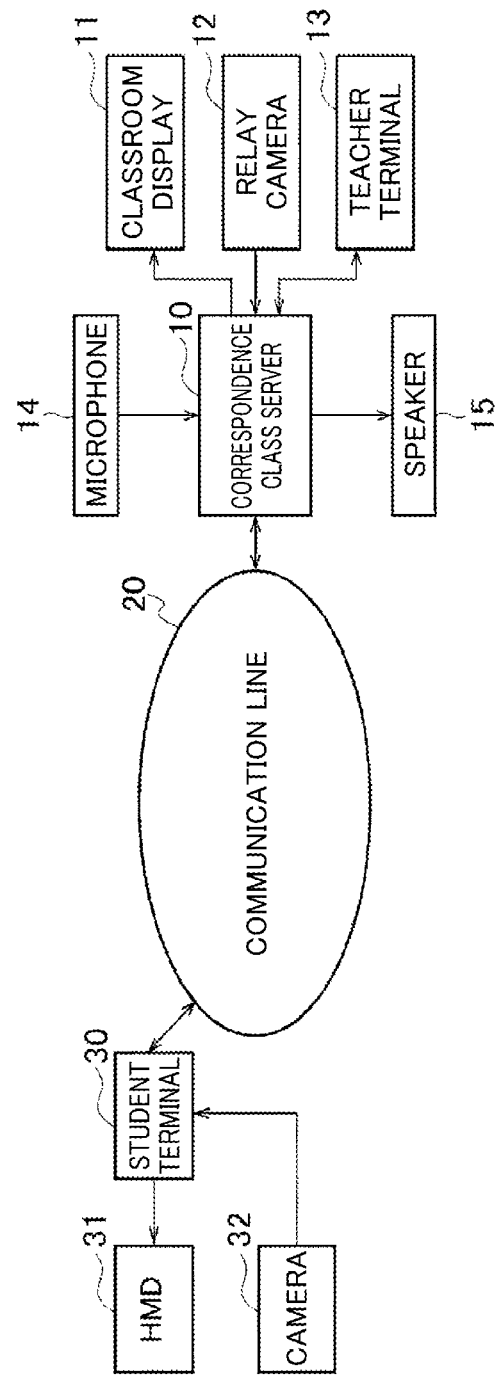
FIG. 1 is a block diagram illustrating an example overall configuration of a class content viewing system according to an embodiment.

The class content viewing system according to this embodiment distributes class contents by using virtual reality (VR). The class content viewing system as illustrated in FIG. 1 includes a correspondence class server 10 and a student terminal 30. The correspondence class server 10 and the student terminal 30 are connected via a communication line 20. The communication line 20 may be any communication line such as the Internet.

Even though FIG. 1 illustrates only one student terminal 30, the class content viewing system according to this embodiment may have any number of the student terminals 30. One student terminal 30 is provided for one student. In a case where a class content is distributed by live streaming, a large number of student terminals 30 are concurrently connected to the correspondence class server 10. If a class content is distributed on demand, the student terminal 30 and the correspondence class server 10 may be connected in one-to-one correspondence.

The student terminal 30 may be any computer device such as a smartphone or a personal computer, as long as being a terminal with a VR function. The student terminal 30 is connected to an HMD 31 and a camera 32. The camera 32 may be included in the HMD 31 or provided with a fixed orientation at a fixed position in a room in which the student is present. The student terminal 30 may be a device, which includes the student terminal 30, the HMD 31, and the camera 32 integrally.

For viewing a class content, a student wears the HMD 31. The student terminal 30 receives information for forming a virtual space from the correspondence class server 10, forms the virtual space according to the received information, and displays, on the HMD 31, a video that is virtually captured in the virtual space. For rendering the virtual space, the student terminal 30 performs such image composition that fits the video of the top of the desk of the student captured by the camera 32 onto the desk object in the virtual space.

The correspondence class server 10 is connected to a classroom display 11, a relay camera 12, a teacher terminal 13, a microphone 14, and a speaker 15. The speaker 15 encompasses a headphone (or an earphone). The correspondence class server 10 generates a class content in the virtual space according to the information received from the devices connected thereto.

Figure 2:
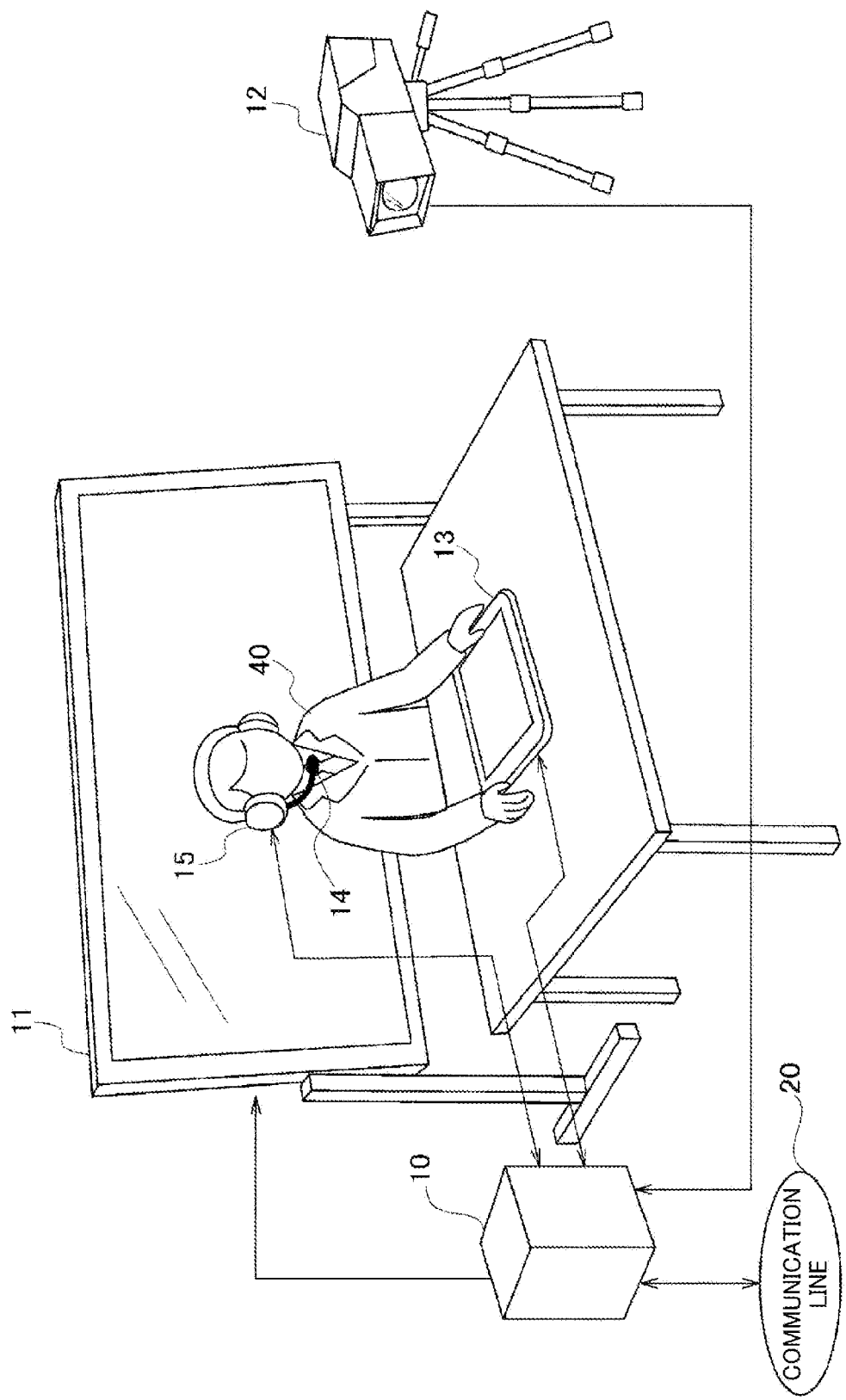
FIG. 2 is a view conceptually illustrating a classroom, from which a class content is delivered.

As illustrated in FIG. 2, a teacher 40, standing in front of the classroom display 11, gives a class by using the classroom display 11 and the teacher terminal 13. The classroom display 11 is a large-screen display called an electronic blackboard. The teacher 40 gives the class by displaying, on the classroom display 11, class data stored in the correspondence class server 10. The class data may be displayed on the teacher terminal 13. The class proceeds in such a way that the class data displayed proceeds in accordance with utterance of the teacher 40. The teacher 40 may operate the teacher terminal 13 to select class data to be displayed on the classroom display 11.

The class data displayed on the classroom display 11 is also displayed on a blackboard object positioned in the virtual space. Instead of the classroom display 11, a blackboard or whiteboard may be employed.

The relay camera 12 is for capturing the image of the class given by the teacher 40. The video data capturing the teacher 40 is transmitted to the correspondence class server 10. The correspondence class server 10 detects the motion and posture of the teacher 40 from the video data, and generates motion data to be reflected on a teacher avatar positioned in the virtual space. The teacher avatar is a computer graphics (CG) character that reflects the motion of the teacher 40. For example, the correspondence class server 10 detects bones (i.e., the skeleton) of the teacher 40 from the video data and moves the teacher avatar based on the detected bones. The correspondence class server 10 distributes the motion data for the teacher avatar to the student terminal 30, the motion data being generated based on the bones. Instead of generating the motion data for the teacher avatar from the video data capturing the teacher 40, the teacher may operate the teacher avatar by wearing an HMD and using a controller.

The microphone 14 is for collecting the voice uttered by the teacher 40. The collected voice data is transmitted to the correspondence class server 10. The correspondence class server 10 distributes the voice data to the student terminal 30.

The speaker 15 is for delivering to the teacher 40 outputs such as instructions on the proceeding of the class from a camera operator. If the class is bidirectional, the speaker 15 may be configured to output voice data transmitted from the student terminal 30.

Note that the class content may be generated using any video, as long as the video captures the class. For example, the class content may be such a class content that bones of characters are detected from a video of an educational program recorded in the past and avatars in a virtual space are moved based on the detected bones.

[Server Configuration]

Figure 3:
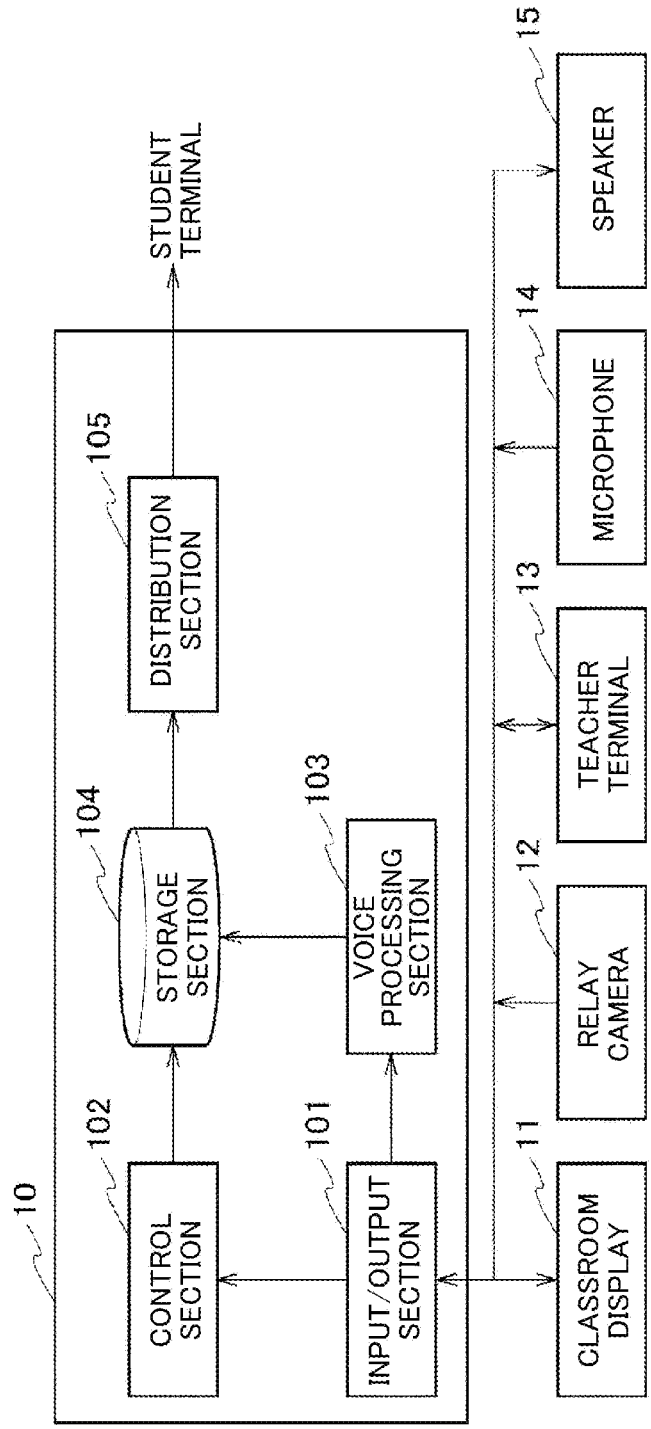
FIG. 3 is a functional block diagram illustrating an example configuration of a correspondence class server.

With reference to FIG. 3, a configuration of the correspondence class server 10 will be described herein. The correspondence class server 10 illustrated in FIG. 3 includes an input/output section 101, a control section 102, a voice processing section 103, a storage section 104, and a distribution section 105.

The input/output section 101 is connected to the classroom display 11, the relay camera 12, the teacher terminal 13, the microphone 14, and the speaker 15, and is configured to output class data or receive video data, audio data, and operations.

The control section 102 detects the motion and posture of the teacher 40 from the video data, and generates motion data for a teacher avatar. The motion data thus generated is stored in the storage section 104. The control section 102 causes the storage section 104 to store therein information displayed on the classroom display 11 and information inputted from the teacher terminal 13.

The voice processing section 103 causes the storage section 104 to store therein voices such as voices received by the microphone 14.

The storage section 104 is configured to store information for constructing a virtual space in which a class is given. Examples of the information for constructing the virtual space include model data on an object positioned in the virtual space, positioning information on the object, and model data and motion data for an avatar. Examples of the object positioned in the virtual space include a blackboard object, objects representing the walls, floor, and ceiling of a classroom, and a desk object of a student. The storage section 104 stores therein the class data including voice data recorded in accordance with the proceeding of the class, the information displayed on the classroom display 11, and the information inputted from the teacher terminal 13.

The distribution section 105 distributes virtual space information for constructing a virtual space in which a class is given. For example, the distribution section 105 distributes the model data for an object and an avatar positioned in a classroom in the virtual space to the student terminal 30 in advance before the class starts. While the class is being viewed, the distribution section 105 timely distributes, to the student terminal 30, data that changes in accordance with the proceeding of the class, the data including the motion data for the teacher avatar, the voice data, and the information to be presented on the blackboard object.

[Terminal Configuration]

Figure 4:
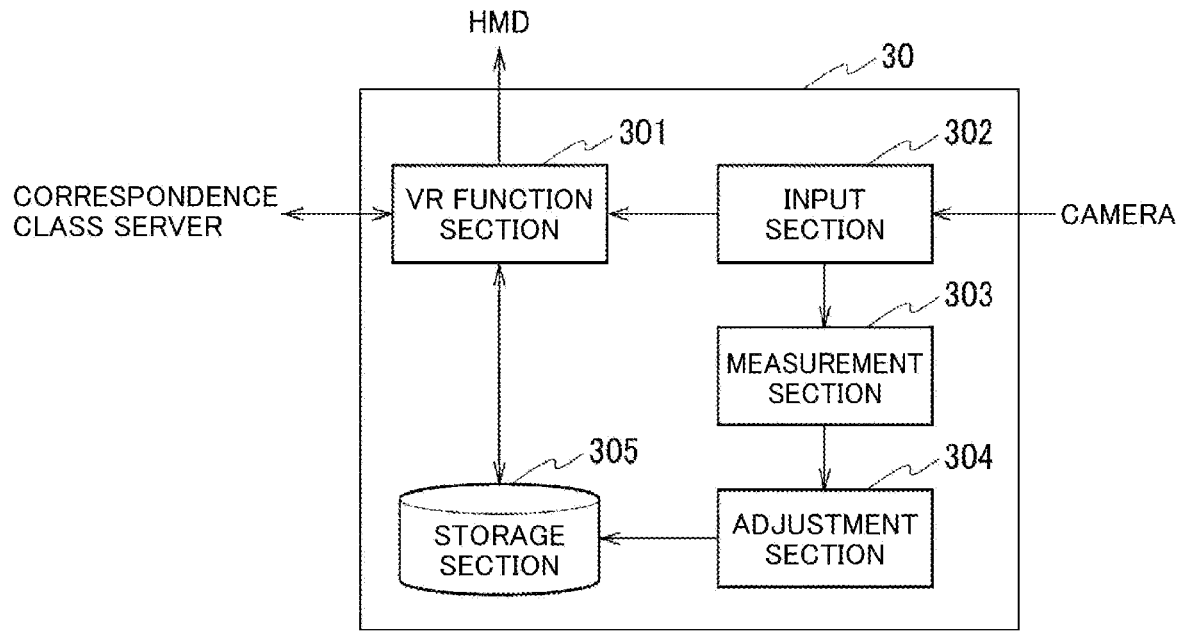
FIG. 4 is a functional block diagram illustrating an example configuration of a student terminal.

With reference to FIG. 4, a configuration of the student terminal 30 will be described herein. The student terminal 30 illustrated in FIG. 4 includes a VR function section 301, an input section 302, a measurement section 303, an adjustment section 304, and a storage section 305.

The VR function section 301 receives virtual space information for constructing a virtual space from the correspondence class server 10 and constructs the virtual space. The VR function section 301 controls a virtual camera according to the head movement of a student detected by the HMD 31 and renders the virtual space according to the virtual camera. The video viewed by the student depicts the virtual space viewed from the viewpoint of a student avatar in the virtual space. The student avatar is a CG character in the virtual space, and represents the student who views the class.

For rendering the virtual space, the VR function section 301 analyzes the video of the real space captured by the camera 32, extracts an area on the desk from the video, and performs image composition for fitting the video capturing the extracted area onto the top plate of the desk object in the virtual space. By doing this, such a video in which the video of the top of the desk in the real space is fused with the desk object in the virtual space is displayed. Since what is displayed is the virtual space obtained by rendering except for the top plate of the desk object on which the video is fitted by the image composition, no sense of immersion is lost.

When the student avatar, that is, the student sees the desk object, the student can see the top of the desk of the real space projected on the top plate of the desk object, with the HMD 31 kept on. Accordingly, a textbook, a notebook, a personal computer, or other items on the desk of the real space can be visible for the student in the virtual space. Since letters or the like written by the student in the notebook in the real space are projected on the desk object, the student can make a note in the real space with the HMD 31 kept on. The video of the real space captured by the camera 32 is an image capturing the real space at least including an area within the reach of the student. The student can use a real object in the real space, while viewing the video of the real space fused with the virtual space. Note that an area within the reach of the student extracted from the video may be fitted on a position other than the desk object in virtual space by the image composition.

The VR function section 301 may be configured such that, when the student opens a drawer of the desk, the VR function section 301 extracts the area of the drawer from the video, and performs such image composition that fits the area of the drawer onto the desk object with the drawer of the desk object open. The desk on which the video is fitted by the image composition is not limited to a writing desk, but may be furniture such as a side table, a side wagon, or a side chest. The desk object also encompasses objects corresponding to these pieces of furniture.

The VR function section 301 may be configured to generate motion data for the student avatar in the virtual space and transmit the motion data to the correspondence class server 10. The student may control the motion of the student avatar by operating a controller.

The input section 302 is for receiving videos captured by the camera 32. The input section 302 may be configured to receive inputs regarding the head movement of the student detected by the HMD 31 and the operation of the controller. The input section 302 may be connected to a microphone, so that the input section 302 receives the voice of the student and transmits to the correspondence class server 10 the voice data thus inputted.

The measurement section 303 is configured such that, before a student views a class content, the measurement section 303 measures to determine three-dimensional space information of the real space in which the desk used by the student is placed, and detects the top plate of the desk in the real space based on the three-dimensional space information thus obtained. For example, the measurement section 303 may be configured to measure to determine the three-dimensional space information in an image-capturing site by capturing a video of the real space with the camera 32 moving, and utilizing a markerless augmented reality (AR) technique for a monocular camera. For example, based on the three-dimensional space information thus obtained, the measurement section 303 detects, as the top plate of the desk, a plane having a predetermined area and being located within a predetermined range of height.

The measurement section 303 may be configured to present some candidate planes of the top plate to the student, so that the student can select a plane for representing the top plate from among the candidate planes. More specifically, for example, the student wears the HMD 31 including the camera 32, and the video captured by the camera 32 is displayed on the HMD 31. The student moves his/her head (i.e., the camera 32) so that the top of the desk falls within the frame of the camera 32. The measurement section 303 detects the plane by measuring for the three-dimensional space information from the video. If the measurement section 303 detects out a plane, the measurement section 303 displays a box representing the detected plane in such a way that the box is superposed on the video captured by the camera 32. When the box representing the plane corresponds to the top plate of the desk, the student performs a determination operation such as using the controller.

The adjustment section 304 is configured to adjust the position of the top plate of the desk object in the virtual space on the basis of a positional relationship between the HMD 31 and the top plate of the desk in the real space. The position of the HMD 31 corresponds to the head of the student avatar. The adjustment section 304 may be configured to adjust the size of the top plate of the desk object to the size of the top plate of the desk in the real space. The adjustment of the position and size of the desk object in accordance with the desk in the real space by the adjustment section 304 makes it possible for the student to touch the desk in the real space by causing the student avatar to touch the top plate of the desk object. The size of the student avatar is adjusted in advance in accordance with the student. An object touchable in the real space is displayed in the virtual space.

The storage section 305 stores therein information necessary for the VR function section 301 to render the virtual space, the three-dimensional space information obtained by the measurement by the measurement section 303, and information on the desk object adjusted by the adjustment section 304. The storage section 305 may store therein information inputted via the input section 302, such as a video captured by the camera 32.

In case where a dedicated booth is prepared for a student to view a class content, the camera 32 may be provided with a fixed orientation at a fixed position from which the camera 32 can capture the desk used by the student. The desk with a predetermined size is used and placed at a predetermined position. Accordingly, the positions of the camera 32 and the desk are fixed, thereby making it unnecessary that the measurement section 303 detects the top plate. The size of the desk has been also predetermined, thereby making it unnecessary that the adjustment section 304 adjusts the desk object. As an alternative, the camera 32 may be provided with a fixed orientation at a fixed position in a student's own room. Once the desk object is adjusted in accordance with the desk in the own room, the adjustment is no more required from the second time.

As the correspondence class server 10 and the student terminal 30, for example, a general-purpose computer system including a central processing unit (CPU), a memory, a storage, a communication device, and an input/output device may be employable. In this computer system, the correspondence class server 10 and the student terminal 30 are realized by the CPU executing a predetermined program loaded on the memory. This program may be recorded in a computer-readable recording medium such as a magnetic disk, an optical disk, or a semiconductor memory, or may be downloaded via a network.

The correspondence class server 10 may perform the rendering of the virtual space. For example, the student terminal 30 transmits the head movement of the student detected by the HMD 31 to the correspondence class server 10. The correspondence class server 10 controls the virtual camera according to the head movement of the student, and renders the virtual space according to the virtual camera. The student terminal 30 receives and displays the image thus rendered.

[Image Composition Processing with the Image Fitting]

Figure 5:
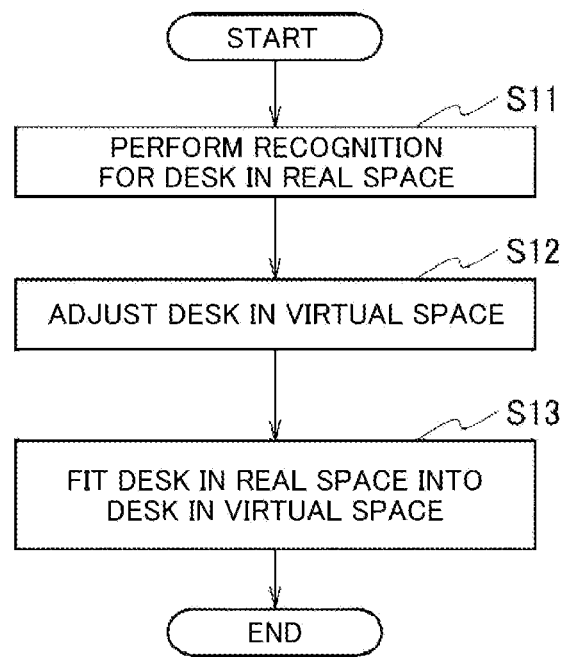
FIG. 5 is a flowchart illustrating a processing flow of image composition for fitting an image of the top of a desk in the real space onto a desk object in a virtual space.

With reference to FIG. 5, a flow of image composition processing with fitting will be described herein.

In step S11, the measurement section 303 detects the position and size of a desk in the real space.

In step S12, the adjustment section 304 adjusts the position and size of a desk object in a virtual space based on the position and size of the desk in the real space. For example, with reference to a distance from the HMD 31 to the top plate of the desk, the adjustment section 304 adjusts a distance from the viewpoint of the student avatar to the top plate of the desk object, and further adjusts the size of the top plate of the desk object.

The position and size of the desk object may be further adjusted in such a way that, after the adjustment of the desk object by the adjustment section 304, the student wearing the HMD 31 causes the desk object to be displayed in the virtual space, and moves a hand or hands to check whether or not the position and size of the desk object in the virtual space correspond to those of the desk in the real space, so that the position and size of the desk object can be finely adjusted.

The processing in steps S11 and S12 described above makes it possible for the desk object in the virtual space to correspond to the desk in the real space.

In step S13, the area on the desk is extracted from a video captured by the camera 32, and a video capturing the extracted area is fitted onto the top plate of the desk object in the virtual space by the image composition. This makes it possible for the student to see the top of the desk of the real space visible in the virtual space with the HMD 31 kept on.

When a student writes in a notebook on a desk in the real space, a hand and an arm of the student is captured in the image of the top of the desk thus captured. For such a case, the video may be displayed with the hand and arm of the student avatar hidden or made see-through.

The VR function section 301 may perform the rendering of an object in such a way that a section corresponding to a real object in the real space is highlighted. For example, the VR function section 301 may perform the rendering in such a way that the top plate of the desk corresponding to a real object in the real space is highlighted by surrounding the edges of the top plate of the desk object with a box. This makes it possible for the student to perceive that, at the section surrounded by the box in the virtual space, a real object is actually present in the real space.

The image composition is so conducted that, even if the head of the student shakes or nods, the image of a real space will not shake with respect to the object.

The function of performing the image composition for fitting the image of the real space may be optionally turned on and off, or may be performed in such a way that a degree of see-through is set for the image of the real space. Even when the display is conducted without such image composition for fitting the image of the real space in the virtual space, the desk object in the virtual space is displayed with the position and size corresponding to the desk in the real space.

[Example of the Image Composition with the Image Fitting]

Figure 6:
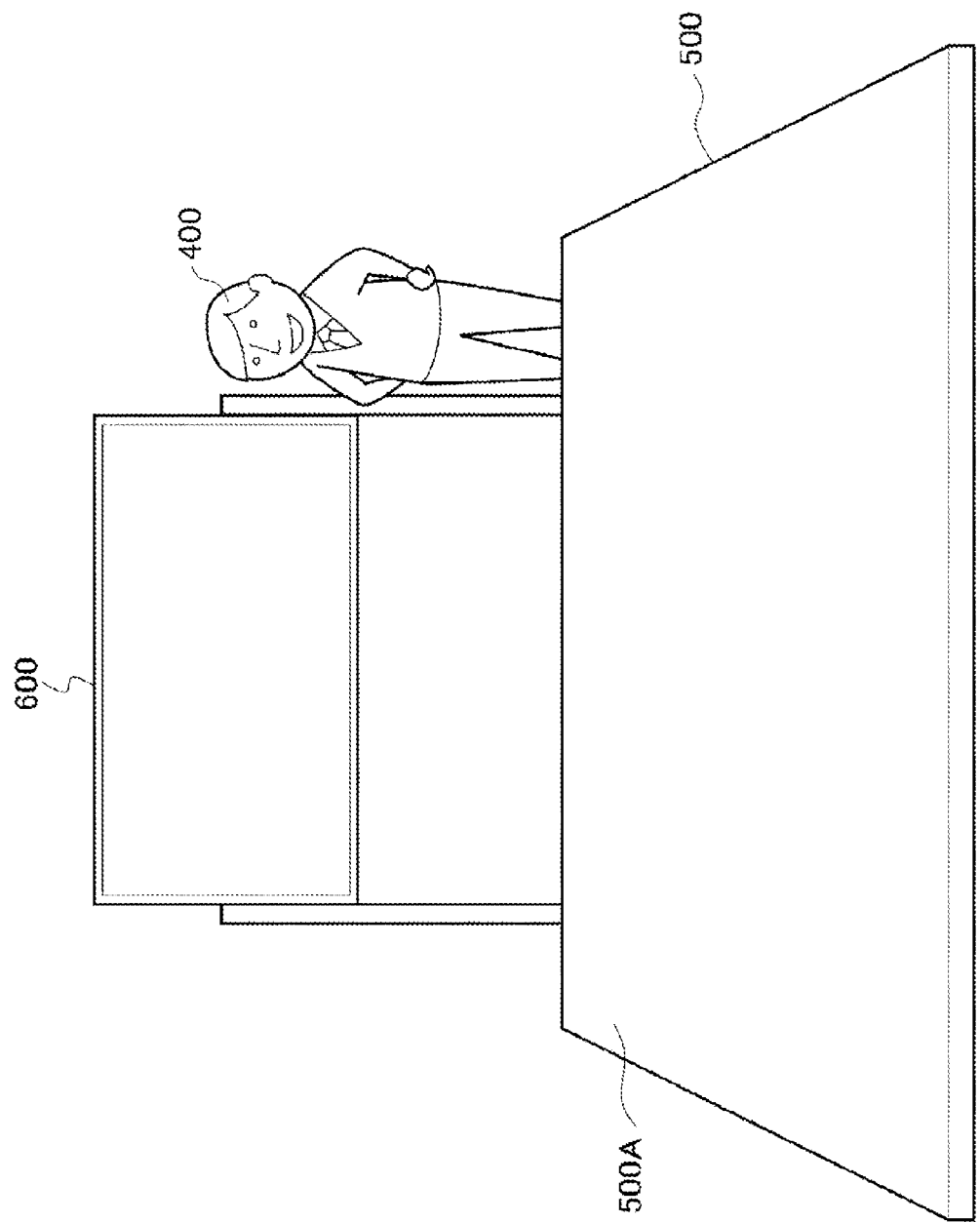
FIG. 6 is a view illustrating an example virtual space before the image composition for fitting the image.
Figure 7:
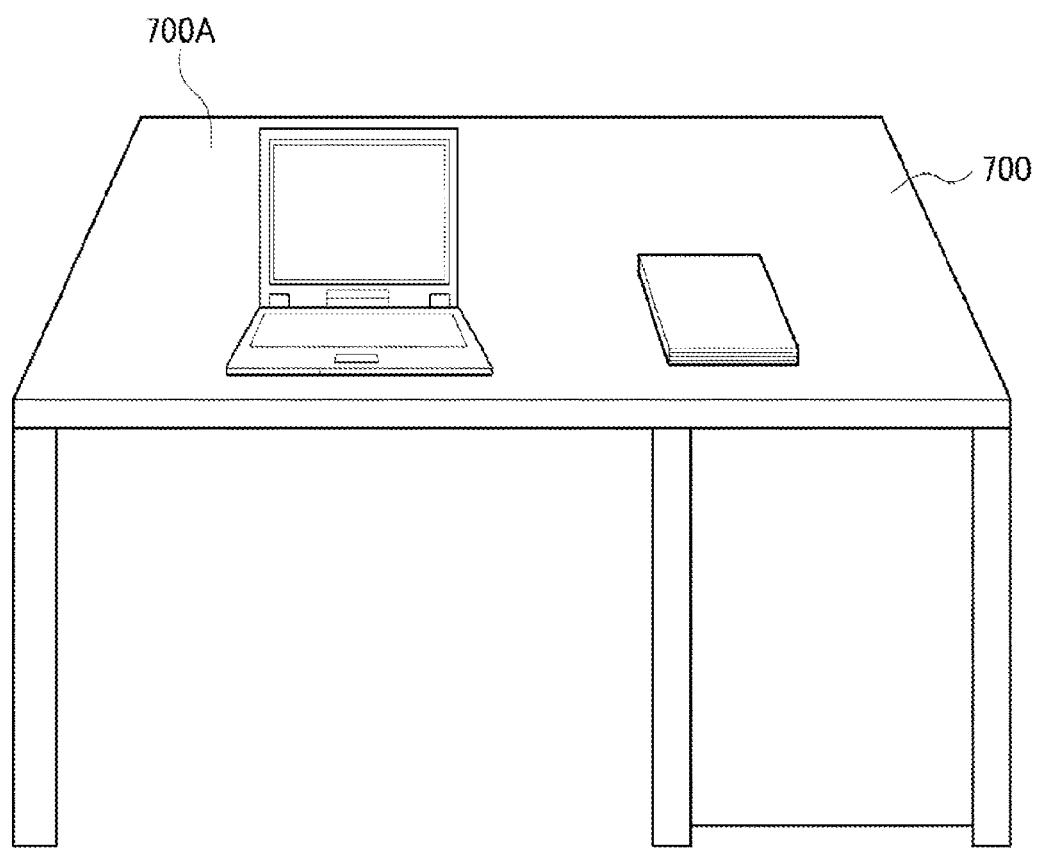
FIG. 7 is a view illustrating an example desk of a student in the real space.
Figure 8:
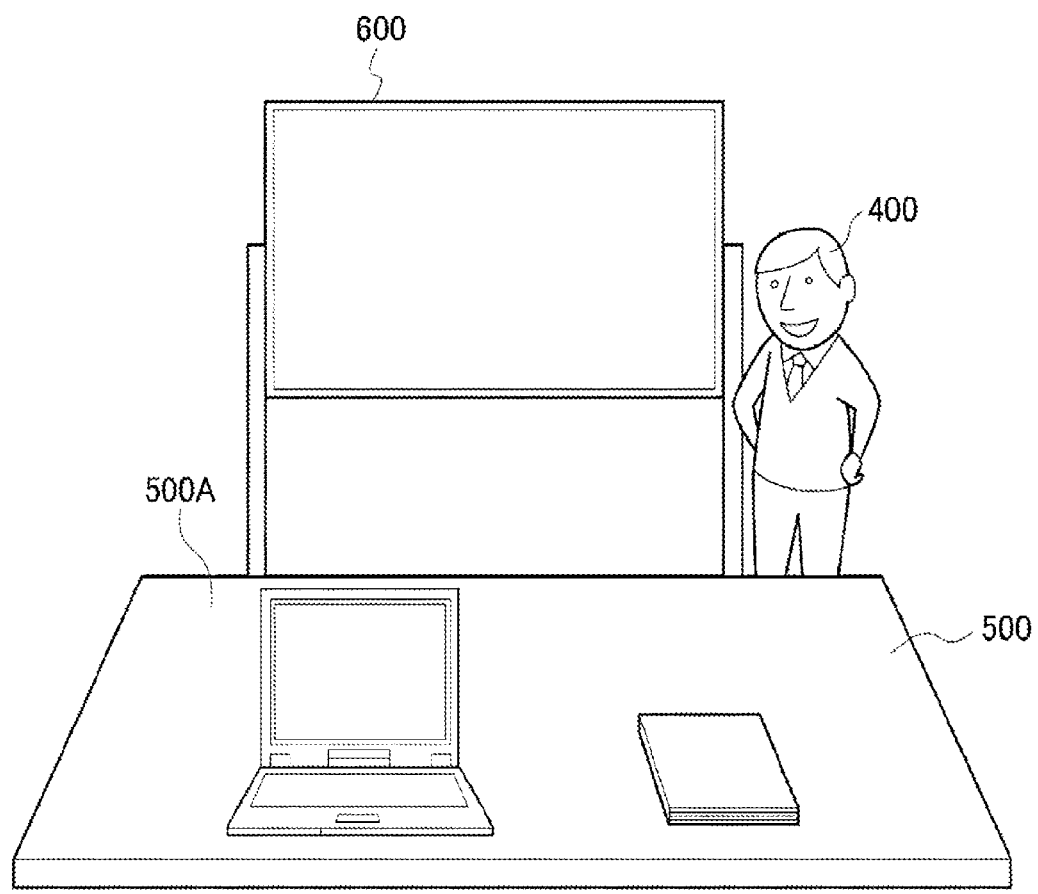
FIG. 8 is a view illustrating an example virtual space obtained by the image composition by fitting in a video capturing the desk illustrated in FIG. 7 onto the virtual space illustrated in FIG. 6.

With reference to FIGS. 6 to 8, an example of the image composition for fitting a video onto a desk object will be described herein.

FIG. 6 is a view illustrating one example of a virtual space before the image composition for fitting the video. FIG. 6 illustrates a teacher avatar 400, a desk object 500, and a blackboard object 600 therein. Objects other than those illustrated, such as a floor, a ceiling, and walls, may be positioned in the virtual space as well.

If a plurality of students takes a class or the class is presented with such an effect that a plurality of students is attending the class, the class may be presented with other student avatars and desk objects positioned therein. The desk objects of the other students may be desk object prepared by the image composition for fitting a video capturing the tops of desks, or may be desk object not prepared by such image composition.

The teacher avatar 400 is a CG character that reflects the motion of the teacher 40 and proceeds with the class. The student terminal 30 controls the teacher avatar 400 according to the motion data received from the correspondence class server 10.

The desk object 500 illustrated in FIG. 6 is not adjusted to correspond to the position and size of the desk in the real space. A student avatar (not illustrated) is present in front of the desk object 500. The image composition fits a video onto a top plate 500A of the desk object 500.

The blackboard object 600 is an object used by the teacher 40 in accordance with the proceeding of the class. The blackboard object 600 is for displaying the information displayed on the classroom display 11 and the information inputted from the teacher terminal 13.

FIG. 7 is a view illustrating one example of a desk of a student in the real space. A desk 700 is a desk positioned within the reach of a student who views the class. The student terminal 30 extracts an area of a top plate 700A of the desk 700 from a video capturing the desk 700 with the camera 32 while the student is viewing the class content.

FIG. 8 illustrates one example of such a virtual space obtained by the image composition for fitting a video capturing the desk shown in FIG. 7 onto the virtual space shown in FIG. 6. In FIG. 8, the video capturing the area of the top plate 700A in FIG. 7 is fitted onto the top plate 500A of the desk object 500 in the virtual space by the image composition. Moreover, the position of the top plate 500A is raised slightly, and the size of the top plate 500A is adjusted in accordance with the top plate 700A in the real space. The personal computer and the notebook placed on the desk 700 in the real space are also projected onto the desk object in the virtual space. The top plate 500A may be displayed with a box surrounding the top plate 500A to indicate that the top plate 500A displayed is one obtained by fitting the video of the real space thereon by the image composition.

In addition to the image composition for fitting the video of the real space onto the desk object, for example, such an image composition for projecting a monitor screen of a personal computer in the real space onto an object in the virtual space may be conducted. More specifically, a keyboard and a mouse of the personal computer are operably placed on the desk. An image of the monitor of the personal computer is captured by a camera. A monitor object corresponding to the monitor of the personal computer is positioned in the virtual space. A display area of the monitor in the real space is extracted from a video capturing the monitor in the real space and fitted on the monitor object in the virtual space by the image composition. This makes it possible for the student to view the display displayed on the monitor object in the virtual space, while operating the personal computer in the real space. Since the monitor object is not something that the student would touch, the position and size of the monitor object in the virtual space may be set freely.

As an alternative, the image composition may be conducted with images of student's own room captured by an omnidirectional camera capable of capturing a 360-degree video, so as to fit the images on the walls, floor, and ceiling of a classroom in the virtual space.

As described above, the class content viewing system according to this embodiment includes the correspondence class server 10 for distributing a class given in a virtual space and the student terminal 30 for viewing the class. The correspondence class server 10 includes the distribution section 105 for distributing virtual space information for displaying the class given in the virtual space. The student terminal 30 includes the VR function section 301 for displaying the virtual space according to the virtual space information, and the input section 302 for receiving a video capturing the real space within the reach of a student who views the class. The VR function section 301 extracts an area including the top plate 700A of the desk 700 from the video, and performs such image composition that fits a video capturing the area onto the top plate 500A of the desk object 500. This makes it possible for the student, without taking off the HMD 31, to see the top of the desk used by the student and also use a textbook, a notebook, a personal computer, or other items on the desk.

DESCRIPTION OF REFERENCE CHARACTERS

10 Correspondence Class Server
101 Input/Output Section
102 Control Section
103 Voice Processing Section
104 Storage Section
105 Distribution Section
11 Classroom Display
12 Relay Camera
13 Teacher Terminal
14 Microphone
15 Speaker
20 Communication Line
30 Student Terminal
301 VR Function Section
302 Input Section
303 Measurement Section
304 Adjustment Section
305 Storage Section
31 HMD
32 Camera

The invention claimed is:

1. A viewing terminal, comprising a processor configured to:
    cause a display device to display a virtual space according to virtual space information, the virtual space including a virtual object representing a real object in a real space, the real object within reach of a student in the real space, the student viewing a class given in the virtual space;
    receive a video image capturing the real space including at least the real object;
    extract a part of the real object from the video image;
    cause the display device to display a part of the virtual object that corresponds to the extracted part of the real object; and
    perform image composition for fitting the video image of the extracted part of the real object onto the corresponding part of the virtual object in the virtual space such that the video image of the extracted part is projected on the corresponding part of the virtual object.

2. The viewing terminal of claim 1, wherein
    the display device is a head mounted display including a camera, and
    the video image is a video image captured by the camera.

3. The viewing terminal of claim 1, wherein
    the virtual object includes a desk object, and the real object includes a desk of the student, and
    the processor is configured to:
        extract the part of the desk of the student from the video image; and
        perform the image composition, which fits the video image of the extracted part of the desk of the student onto the corresponding part of the desk object in the virtual space.

4. The viewing terminal of claim 3, wherein the processor is further configured to:
    measure a position and a size of the desk of the student in the real space; and
    adjust a position and a size of the desk object according to a result of the measurement.

5. The viewing terminal of claim 4, wherein
    the display device is a head mounted display including a camera, and
    the video image is a video image captured by the camera.

6. The viewing terminal of claim 3, wherein
    the display device is a head mounted display including a camera, and
    the video image is a video image captured by the camera.

7. The viewing terminal of claim 1, wherein the video image viewed by the student depicts the virtual space viewed from a viewpoint of a student avatar in the virtual space.

8. A viewing method for a viewing terminal for viewing a class given in a virtual space that is immersive, the method comprising:
    displaying the virtual space according to virtual space information, the virtual space including a virtual object representing a real object in a real space, the real object within reach of a student in the real space, the student viewing the class given in the virtual space;
    receiving a video image capturing the real space including at least the real object;
    extracting a part of the real object from the video image;
    cause the display device to display a part of the virtual object that corresponds to the extracted part of the real object;
    performing image composition for fitting the video image of the extracted part of the real object onto the corresponding part of the virtual object in the virtual space such that the video image of the extracted part is projected on the corresponding part of the virtual object.

9. The viewing method of claim 8, wherein
    the virtual object includes a desk object, and the real object includes a desk of the student, and
    the method further comprises:
    extracting the part of the desk of the student from the video image; and
    performing the image composition for fitting the video image of the extracted part of the desk of the student onto the corresponding part of the desk object in the virtual space.

10. The viewing method of claim 9, further comprising:
    measuring a position and a size of the desk of the student in the real space; and
    adjusting a position and a size of the desk object according to a result of the measurement of the position and the size of the desk of the student.

11. A viewing system, comprising:
    a server configured to distribute a class in a virtual space; and
    a viewing terminal configured to view the class,
    the server including a processor configured to:
    distribute virtual space information for displaying the class,
    the viewing terminal including a processor configured to:
    cause a display device to display the virtual space according to the virtual space information, the virtual space including a virtual object representing a real object in a real space, the real object within reach of a student in the real space, the student viewing the class given in the virtual space;
    receive a video image capturing the real space including at least the real object;
    extract a part of the real object from the video image;
    cause the display device to display a part of the virtual object that corresponds to the extracted part of the real object; and
    perform image composition for fitting the video image of the extracted part of the real object onto the corresponding part of the virtual object in the virtual space such that the video image of the extracted part is projected on the corresponding part of the virtual object.

12. The viewing system of claim 11, wherein
    the virtual object includes a desk object, and the real object includes a desk of the student, and
    the processor of the viewing terminal is configured to:
    extract the part of the desk of the student from the video image; and
    perform the image composition, which fits the video image of the extracted part of the desk of the student onto the corresponding part of the desk object in the virtual space.

13. The viewing system of claim 12, wherein the processor of the viewing terminal is further configured to:
    measure a position and a size of the desk of the student in the real space; and
    adjust a position and a size of the desk object according to a result of the measurement.

14. The viewing system of claim 13, wherein
    the display device is a head mounted display including a camera, and
    the video image is a video image captured by the camera.

15. The viewing system of claim 12, wherein
    the display device is a head mounted display including a camera, and
    the video image is a video image captured by the camera.

16. The viewing system of claim 11, wherein
    the display device is a head mounted display including a camera, and
    the video image is a video image captured by the camera.

17. The viewing system of claim 11, wherein the processor of the viewing terminal is further configured to generate motion data for a student avatar in the virtual space and transmit the motion data to the server.

18. A non-transitory computer readable medium storing thereon a program which, when executed, causes a computer to execute:
    displaying a virtual space according to virtual space information, the virtual space including a virtual object representing a real object in a real space, the real object within reach of a student in the real space, the student viewing a class given in the virtual space;
    receiving a video image capturing the real space including at least the real object;
    extracting a part of the real object from the video image;
    cause the display device to display a part of the virtual object that corresponds to the extracted part of the real object; and
    performing image composition for fitting the video image of the extracted part of the real object onto the corresponding part of the virtual object in the virtual space such that the video image of the extracted part is projected on the corresponding part of the virtual object in the virtual space.

19. The non-transitory computer readable medium of claim 18, wherein
    the virtual object includes a desk object, and the real object includes a desk of the student, and
    the program, when executed, further causes the computer to execute:
    extracting the part of the desk of the student from the video image; and
    performing the image composition for fitting the video image of the extracted part of the desk of the student onto the corresponding part of the desk object in the virtual space.

20. The non-transitory computer readable medium of claim 18, wherein the program, when executed, further causes the computer to execute:
    measuring a position and a size of the desk of the student in the real space; and
    adjusting a position and a size of the desk object according to a result of the measurement of the position and the size of the desk of the student.

* * * * *